United States Patent Office 3,375,210
Patented Mar. 26, 1968

3,375,210
METHOD OF PRODUCING CARBONATE
POLYMER FOAMS
Anthony A. D'Onofrio, Martinsville, N.J., assignor to Union Carbide Corporation, a corporation of New York
No Drawing. Filed Aug. 25, 1964, Ser. No. 392,020
9 Claims. (Cl. 260—2.5)

ABSTRACT OF THE DISCLOSURE

Process for preparing a (2,2,4,4-tetramethyl-1,3-cyclobutylene)carbonate polymer foam comprising the steps of heating a normally solid (2,2,4,4-tetramethyl-1,3-cyclobutylene)carbonate polymer wherein the cyclobutylene carbonate moiety is present in a mole percent of at least about 50 percent, to a temperature above its melting point, maintaining the molten mass at a temperature and for a period of time sufficient to cause the evolution of gaseous polymer degradation products, maintaining a pressure about the molten polymer mass such that the gaseous products are retained within the molten polymer mass, and cooling the polymer mass to a temperature sufficient to cause solidification.

This invention relates to mehods of producing carbonate polymer foams by the thermal degradation of the carbonate polymer. More particularly, this invention relates to production of foamed (2,2,4,4-tetramethyl-1,3-cyclobutylene)carbonate polymers.

Most thermoplastic resins thermally degrade under controlled conditions to produce polymers which exhibit a substantially lower molecular weight. Such degradation occurs through the mechanism of chain cleavage in the polymer molecules. This type of degradation is substantially uniform in its effect on the polymeric molecules, that is to say substantially all of the molecules of the polymer treated are degraded to about the same extent within a given time. Uniform degradation then results in a polymer which has a uniformly lower molecular weight than the original polymer. The extent of degradation for molecular weight reduction is dependent upon such factors as pyrolysis temperature, residence time of the polymer at the pyrolysis temperature, the peculiar stability of the individual polymer and other such factors. Typical and illustrative of the polymers which exhibit the normal type of thermal degradation is polyethylene. For example, if a low density polyethylene resin having an average molecular weight of about 30,000 is heated to a temperature of about 370° C. and maintained at this temperature for a period of about 4 minutes, the product resin will generally exhibit an average molecular weight of about 10,000. Substantially all the molecules of the pyrolysis sample will have been cleaved or degraded. If such resins are heated until gases and volatile degradation products are released, the average molecular weight of the polymer mass is so low that it is non-solid. It is for this reason that foamed thermoplastics are generally produced through the addition of a foaming or blowing agent which releases gas bubbles at the desired fabrication conditions of temperature and pressure.

As a class, carbonate polymer resins generally degrade in a manner similar to that of polyethylene. That is, they degrade uniformly to produce a pyrolysis resin exhibiting a lower average molecular weight. It has now been found, however, that (2,2,4,4-tetramethyl-1,3-cyclobutylene)carbonate polymers degrade by an entirely different mechanism. When these resins are heated to pyrolysis temperature, degradation occurs in a non-uniform manner. When a molecule of this polymer degrades, it degrades completely leaving the other molecules in the polymer mass substantially unaffected. For this reason, large volumes of gases are generated when these polymers are degraded, but the undegraded molecules remaining in the polymer mass retain substantially the same or a slightly reduced molecular weight. The large volume of gas generated within the molten resin mass produces a polymeric foam having a more uniform pore distribution that that obtained through the use of conventional blowing agents.

Thus, in accordance with the present invention, it has been found that tough (2,2,4,4-tetramethyl-1,3-cyclobutylene)carbonate polymer foam compositions can be prepared by a process comprising the steps of heating a normally solid (2,2,4,4-tetramethyl-1,3-cyclobutylene)-carbonate polymer to a temperature above its melting point to form a molten polymer mass, maintaining said molten mass at a temperature and for a period of time sufficient to cause the evolution of gaseous polymer degradation products, maintaining the pressure about said molten polymeric mass such that gaseous products are retained within the molten polymer mass, and cooling the polymer mass to a temperature sufficient to cause solidification.

In another embodiment of this invention, it is provided that the (2,2,4,4-tetramethyl-1,3-cyclobutylene)carbonate polymers be thermally degraded at normal fabrication temperatures for such polymers with the aid of a catalyst system more fully described hereinafter.

By the term (2,2,4,4-tetramethyl-1,3-cyclobutylene)-carbonate polymer is meant both the carbonate homopolymers of 2,2,4,4-tetramethyl-1,3-cyclobutanediol and copolymers as more completely defined hereinafter.

Structurally 2,2,4,4-tetramethylcyclobutanediol-1,3 is represented as

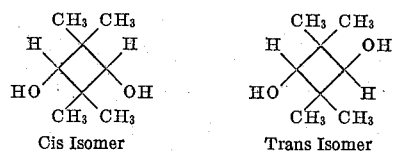

Cis Isomer        Trans Isomer and is ordinarily available as a mixture of cis and trans isomers although either the mixture or the pure isomers may be used in this invention.

The polycarbonate homopolymers useful in this invention consist of alternating carbonate groups,

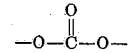

and the divalent moiety of 2,2,4,4-tetramethylcyclobutylene formed by theoretically splitting off both hydroxyl groups of 2,2,4,4-tetramethylcyclobutanediol-1,3 to yield the divalent radical

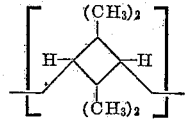

As used hereinafter throughout the specification and in the claims, the term "2,2,4,4-tetramethylcyclobutylene moiety" is intended to define this structural unit.

In addition to homopolymers which consist of a linear series of 2,2,4,4-tetramethylcyclobutylene moieties joined by carbonate linkages, the novel polycarbonate resins of this invention can contain one or more or all of the following: dihydric phenol moieties, aliphatic diol moieties, dicarboxylic acid moieties and hydroxy monocarboxylic acid moieties. Polymers containing certain of these moieties only are characterized by having carbonate linkages only, some of which carbonate linkages connect structurally different recurring units. These polycarbonates are termed herein polycarbonate copolymers. On the other hand, other permissible moieties give rise to ester linkages

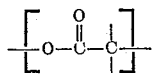

in the final polymer products. The polymers containing both carbonate and ester linkages are termed copolyesters. The differences and similarities of all three types of polycarbonates within the scope of this invention are more precisely set forth hereinafter. These copolymers and copolyesters can be used in the present invention provided the copolymer or polyester contains at least 50 and preferably 75 percent of the cyclobutylene carbonate moiety.

It has been found that the polycarbonates of this invention can be advantageously prepared by the general method of alcoholysis and ester interchange. In this aspect the starting material can be 2,2,4,4-tetramethylcyclobutanediol-1,3 per se or an aliphatic or aromatic ester thereof. A detailed description of the processes for preparing homopolymer, copolymers, and copolyesters is provided herewith.

Homopolymer

Suitable for the preparation of polycarbonate homopolymers of 2,2,4,4-tetramethylcyclobutanediol-1,3 is the ester interchange process in which the carbonate precursor is a diester of carbonic acid. The 2,2,4,4-tetramethylcyclobutanediol-1,3 per se can be employed as a reactant, or the mono- or the diester derivatives thereof can be employed. The suitable ester derivatives in general conform to the general formula:

(I)
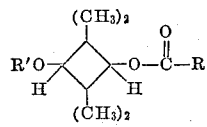

in which R represents an alkyl or aryl radical free of substituent groups reactive in the reaction system employed herein, and R' is either hydrogen or a

group wherein R is an alkyl or aryl group such as specified above. Preferably R is an unsubstituted alkyl group containing from 1 to about 6 carbon atoms or an unsubstituted phenyl group, but inert substituents such as halogen, alkyl, aryl, alkaryl, and aralkyl on either the alkyl or phenyl radical are not harmful to the reaction. In general, amine, carboxyl, and hydroxyl substituents are reactive and are to be avoided in the preparation of linear homopolymers.

As the carbonate precursor, diphenyl carbonate is considered the preferred species. Also suitable are other diaryl esters such as dinaphthyl carbonate, dialkyl esters such as diethyl carbonate, di-isobutyl carbonate, dibutyl carbonate, di-n-hexyl carbonate and the like, and mixed alkyl-aryl di-esters such as phenylethyl carbonate, naphthylpropyl carbonate and the like. In general, the suitable carbonic acid esters conform to the general formula:

(II)
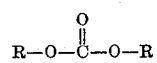

wherein R at each occurrence is a monovalent organic radical specified for R in Formula I above.

Reaction of the cyclic diol or the permissible derivatives thereof with the carbonate precursor is in general carried out under elevated temperature conditions sufficient to cause the reactants to be present in the molten state, but this is not a critical consideration. The reactants have been found to be substantially reactive even in the solid state. Although the temperature achieving optimum reaction conditions will vary somewhat for the various reactant species selected, temperatures in the range of from about 50° C. to about 350° C. have been found generally suitable. The temperature of the reaction is preferably from about 100° C. to about 250° C., the optimum range being readily ascertained by those skilled in the art.

It has been found that the inter-reaction of the starting materials is spontaneous and self-supporting without benefit of a catalyst. Faster overall reaction times are achieved, however, by the use of a catalyst material, such as magnesium metal, preferably in the form of machine turnings or gross particles, alkyl zinc compounds, such as di-n-butyl zinc, $LiOH \cdot H_2O$, LiOH, and lithium acetate, titanium esters such as tetra-n-butyl titanate, zinc oxide, lead oxide, manganese dioxide, and the like. The lithium compounds are preferred catalysts. Catalyst concentrations are not at all critical, but are advantageously in the range of from about 0.0001 to about 2.0 mole percent based on the amount of cyclic diol, or derivatives thereof, present. Reduced pressures are advantageously employed, particularly in the latter stages of the reaction when the viscosity mass increases due to increasing polymer molecular weight and by-product volatilization becomes inhibited. In this regard absolute pressures of the order 0.2 to 5.0 mm. Hg are easily attained and have been found to be quite effective.

Homopolymeric products have been found to result from the inter-reaction of the cyclic diol and carbonate precursor when combined in any proportion. Stoichiometric excesses of as much as 50% of either of the reactants have been found to yield homopolymers of deserable molecular weight. Although equal molar quantities of the carbonate precursor and the cyclic diol give adequate results, it has been found that a slight excess, i.e., from about 0.5 to about 10 percent molar excess of either reactant gives rise to homopolymers of somewhat higher molecular weight than result with other reactant proportions.

The polycarbonate homopolymers of greatest utility are those which are of sufficiently high molecular weight to be normally solid, i.e., solid at normal room temperatures, but are also of sufficiently low molecular weight to be tractable, i.e., formable with conventional hot processing equipment. In general, in the homopolymer represented by the structure

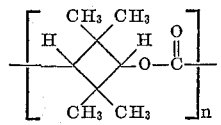

the number $n$ has a value such that the reduced viscosity (0.2 gram polymer in 100 milliliters of chloroform solution at 25° C.) of the polymer is from about 0.25 to about 10.0, but preferably from about 0.4 to 2.7, with the narrow range of 0.48 to 0.99 being particularly preferred.

Because of the chemical inertness, rigidity, low density, and solvent resistance of the foamed homopolymer composition made therefrom are particularly useful for insulating containers and structural members. These polymer foams are particularly suitable in outdoor applications because of their resistance to ultra-violet degradation.

Copolymer

The modified homopolymers which are designated hereinafter as polycarbonate copolymers are characterized by containing as recurring units within the polymer chain, moieties of one or more diols other than an in addition to 2,2,4,4-tetramethylcyclobutylene moieties. The modifying diols can be either dihydric phenols, bisphenols, aliphatic diols, or mixed diols in which one of the two active hydroxyl groups is directly attached to an aromatic ring and the other reactive hydroxy group is attached to an aliphatic carbon atom.

The diphenol reactants suitably employed include any of the diphenols heretofore employed in the formation of prior known polycarbonate resins. Conveniently they can be classified as conforming to the general Formula III HO—Ar—R$_n$—Ar—OH in which Ar in each occurrence represents a divalent aromatic radical, preferably phenylene, but also can be polynuclear, such as biphenylene, a fused ring structure having an aromatic character such as naphthylene, anthrylene and the like, or mixed polynuclear aromatic radicals. The divalent radical

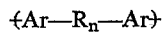

is hereinafter identified as a divalent aromatic carbocyclic group derived from a dihydric phenol. R in each occurrence can be an alkylene or alkylidene radical such as methylene, ethylene, propylene, propylidene, isopropylidene, butylene, butylidene, isobutylidene, amylene, isoamylene, amylidene, isoamylidene and the like; a cycloaliphatic radical such as cyclopentylidene, cyclohexylidene and vinyl cyclo hexylidene; a divalent radical formed from two or more alkylene or alkylidene groups connected by a nonalkylene or nonalkylidene group such as an aromatic linkage, a cycloaliphatic linkage, a tertiary amino linkage an ether linkage, a thioether linkage, a carbonyl linkage, a sulfur-containing linkage such as sulfoxide or sulfone; an ether linkage, a carbonyl group, or a silicon-containing group; $n$ can be either zero or one.

Both Ar and R in the above general formula can contain substituent groups inert toward the reactants under the conditions of the reaction system. Such substituents include monovalent hydrocarbon groups free of acetylenic unsaturation such as methyl, ethyl, propyl, phenyl, naphthyl, benzyl, ethylphenyl, cyclopentyl, cyclohexyl and the oxy derivatives thereof; inorganic radicals such as chlorine, bromine, fluorine, and the like.

Specifically illustrative of the dihydric phenols that may be employed in this invention, but in no way limitative thereof, are 2,2-bis(4-hydroxyphenyl)propane;
2,4'-dihydroxydiphenylmethane;
bis(2-hydroxyphenyl)methane;
bis(4-hydroxyphenyl)methane;
bis(4-hydroxy-5-nitrophenyl)methane;
bis(4-hydroxy-2,6-dimethyl-3-methoxyphenyl)methane;
1,1-bis(4-hydroxyphenyl)ethane;
1,2-bis(4-hydroxyphenyl)ethane;
1,1-bis(4-hydroxy-2-chlorophenyl)ethane;
1,1-bis(2,5-dimethyl-4-hydroxyphenyl)ethane;
1,3-bis(3-methyl-4-hydroxyphenyl)propane;
2,2-bis(3-phenyl-4-hydroxyphenyl)propane;
2,2-bis(3-isopropyl-4-hydroxyphenyl)propane;
2,2-bis(4-hydroxynaphthyl)propane;
2,2-bis(4-hydroxyphenyl)pentane;
3,3-bis(4-hydroxyphenyl)pentane;
2,2-bis(4-hydroxyphenyl)heptane;
bis(4-hydroxyphenyl)phenylmethane;
bis(4-hydroxyphenyl)cyclohexylmethane;
1,2-bis(4-hydroxyphenyl)-1,2-bis(phenyl)propane;
2,2-bis(4-hydroxyphenyl)-1-phenylpropane;
the bisphenol of 4-vinyl cyclohexene;

and the like. Also included are dihydroxybenzenes typified by hydroquinone and resorcinol, dihydroxydiphenyls such as 4,4'-dihydroxydiphenyl; 2,2'-dihydroxydiphenyl; 2,4'-dihydroxydiphenyl; dihydroxynaphthalenes such as 2,6-dihydroxynaphthalene, and the like, bis-(4-hydroxyphenyl)sulfone; 2,4'-dihydroxydiphenyl sulfone; 5'-chloro-2,4'-dihydroxydiphenyl sulfone; 5'-chloro-2,4'-dihydroxydiphenyl sulfone; 3'-chloro-4,4'-dihydroxydiphenyl sulfone; 4,4'-dihydroxytriphenyl disulfone, etc.; 4,4'-dihydroxydiphenyl ether; 4,4'-dihydroxytriphenyl ether; the 4,3'-, 4,2'-, 4,1'-, 2,2'-, 2,3'-, etc. dihydroxydiphenyl ethers; 4,4'-dihydroxy-2,6-dimethyldiphenyl ether; 4,4'-dihydroxy-2,5-dimethyldiphenyl ether; 4,4'-dihydroxy-3,3'-diisobutyldiphenyl ether; 4,4'-dihydroxy-3,3'-diisopropyldiphenyl ether; 4,4'-dihydroxy-3,2'-dinitrodiphenyl ether; 4,4'-dihydroxy-3,3'-dichlorodiphenyl ether; 4,4'-dihydroxy - 3,3' - difluorodiphenyl ether; 4,4' - dihydroxy-2,3-dibromodiphenyl ether; 4,4'-dihydroxydinaphthyl ether; 4,4'-dihydroxy-3,3'-dichlorodinaphthyl ether, 2,4-dihydroxytetraphenyl ether; 4,4'-dihydroxypentaphenyl ether; 4,4'-dihydroxy-2,6-dimethoxydiphenyl ether; 4,4'-dihydroxy-2,5-diethoxydiphenyl ether, etc. Mixtures of the dihydric phenols can also be employed and where dihydric phenol is mentioned herein, mixtures of such materials are considered to be included. Preferably the dihydric phenol is a bis(4-hydroxyphenyl) alkane in which the central alkane group contains from 1–8 carbon atoms. Especially preferred dihydric phenols are gem-bis(4-hydroxyphenyl) alkanes in which the central alkylidene group contains from 1–8 carbon atoms.

The aliphatic diols include cycloaliphatic, straight and branched chain diols free of substituent groups reactive toward the other reactants of the reaction system. In general, these diols conform to the formula (IV)  HO—Y—OH in which Y can be an alkylene group such as ethylene, propylene, butylene, amylene, isoamylene, neopentylene and the like; two or more alkylene or alkylidene groups connected by a nonalklene or nonalkylidene group such as an ether linkage, an aromatic linkage, a carbonyl linkage, a sulfur containing linkage such as sulfide, sulfoxide or sulfone, a cycoaliphatic group such as cyclopentyl, cyclohexyl, or a silicon-containing linkage such as silane or siloxy; and a cycloaliphatic group such as cyclopentylene and cyclohexylene. Substituent groups on the Y group can be halogen, nitro, cyano or aryl, but reactive groups such as hydroxyl (other than the two such groups necessarily present) amine, and carboxyl are to be avoided if cross-linking of the polymer is to be avoided.

The preparation of the polycarbonate copolymers is accomplished by the method described hereinbefore for preparing polycarbonate homopolymers from 2,2,4,4-tetramethylcyclobutanediol-1,3. Reaction conditions with respect to temperature, pressure, catalysts, chain growth terminators, solvents, carbonate precursors, concentration of reactants and the like, apply with equal force to the preparation of the copolymers. Either one or a mixture of dihydroxy compounds other than 2,2,4,4-tetramethylcyclobutanediol-1,3 can be suitably employed provided that the 2,2,4,4-tetramethylcyclobutanediol-1,3 is present in a mole percent of at least about 50% and preferably not less than 75%, based on the total moles of dihydroxy compounds in the formulation of reactants.

The copolymers are in general represented by the structure (V)
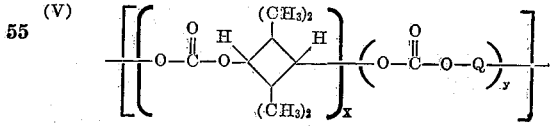

wherein Q in each occurrence represents an

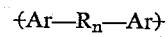

group or +Y+ group of Formulae II and IV above respectively, $m$ has a value such that the reduced viscosity of the copolymer (0.2 gram polymer in 100 ml. chloroform solution at 25° C.) is at least about 0.25 to about 10.0, preferably from about 0.4 to 2.7, and $x/y(x+y)$ has a value of at least about 0.6 and preferably at least about 0.8. It is particularly preferred that the polymer have a reduced viscosity value of from about 0.48 to 0.99.

These copolymers and also the copolyesters of this invention are useful in all applications set forth hereinbefore for the homopolymers of this invention, and possess generally the improved resistance to outdoor weathering and resistance to strong bases, exhibited by the homopolymers. The copolyesters are, as a rule, more easily extruded than either the copolymers or the homopolymers.

*Copolyesters*

The copolyesters are prepared by the method of ester-interchange as described hereinbefore for the preparation of the 2,2,4,4-tetramethylcyclobutanediol-1,3 polycarbonate homopolymer and the polycarbonate copolymers thereof, except that an organic acid conforming to the general formula (VI)
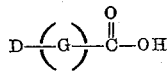

is employed as an additional reactant. In Formula VI, D represents either a hydroxyl or a carboxyl group, and G is an alkylene or alkylidene group such as ethylene, propylene, propylidene, isopropylidene, butylidene, butylene, isobutylidene, amylene, isoamylene, amylidene, isoamylidene, neopentyl; a cycloaliphatic group such as cyclopentylene, or cyclohexylene; divalent hydrocarbon groups free of acetylenic unsaturation, an aromatic radical such as phenylene, naphthylene, biphenylene, substituted phenylene, etc.; two or more aromatic groups connected through nonaromatic linkages such as those defined by R in Formula III; an aralkyl radical such as tolylene, xylylene, etc. G should be free of amine, hydroxyl and carboxyl groups, i.e., the acid of Formula VI should be a difunctional compound in the present reaction system. As used hereinafter the structure

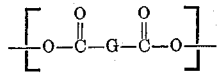

is termed the residue of a dicarboxylic acid, and the structure

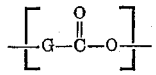

is termed the residue of a monohydroxymonocarboxylic acid.

Included within the scope of this invention are the saturated, aliphatic dibasic acids derived from straight chain paraffin hydrocarbons, such as malonic, dimethyl malonic, succinic, glutaric, adipic, pimelic, suberic, azelaic and sebacic acid. Also included are the halogen-substituted aliphatic dibasic acids. Aliphatic carboxylic acids containing hetero atoms in their aliphatic chain, such as thiodiglycollic or diglycollic acid can also be used. Also useful are olefinically unsaturated acids as, for example, maleic or fumaric.

Examples of suitable aromatic and aliphatic-aromatic dicarboxylic acids which may be used are phthalic, isophthalic, terephthalic, homophthalic, o-, m-, and p-phenylenediacetic acid; the polynuclear aromatic acids such as diphenic acid, and 1,4-naphthalic acid, isopropylidene bisphenoxyacetic acid.

Examples of hydroxy acids are the aliphatic hydroxy acids such as hydroxybutyric acid, glycollic acid and lactic acid. Examples of aromatic and aliphatic-aromatic hydroxy acids are mandelic acid, p-, m-, and o-hydroxy benzoic acid. The hydroxy-substituted long-chain fatty acids, such as 12-hydroxystearic acid may also be used. Cycloaliphatic acids including tetrahydrophthalic, tetrahydroterephthalic, tetrahydroisophthalic, 3,6-endomethylenetetrahydrophthalic, hexachloro-3,6-endomethylenetetrahydrophthalic acid or camphoric acid may also be used.

Mixtures of the carboxylic acids can also be employed and where carboxylic acid is mentioned herein, mixtures of such materials are considered to be included. In the ester-interchange process, the esters and anhydrides of the acids described above can also be suitably employed.

Since the hydroxyl group of a hydroxy monocarboxylic acid gives rise to a carbonate linkage

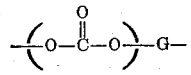

and the carboxylate group gives rise to an ester

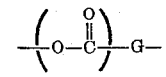

linkage in the final polymer, it will be obvious that different proportions of a hydroxy monocarboxylic acid will be required in the reaction mixture to yield a polymer having a given ratio of ester to carbonate linkages than is the case with a dicarboxylic acid.

When a hydroxy monocarboxylic acid is employed polymeric products have been found to result from the interreaction thereof with the carbonate precursor (Formula II above) and 2,2,4,4-tetramethylcyclobutanediol-1,3 in any proportions so that the molar concentration of carbonate precursor is greater than the sum of the molar concentrations of the hydroxy acid and the cyclic diol, with the further provision that the ratio of the concentration of the cyclic diol to the concentration of the hydroxy acid is greater than zero, i.e., a finite amount of cyclic diol must be present even though the amount can be quite small. Stated more concisely, $C > (A+B)$ and $A/B > 0$ where C is the concentration of carbonate precursor, B is the concentration of the hydroxy acid, and A is the concentration of the cyclic diol.

It will be apparent that wide variations in proportions are possible within the limits prescribed above. By varying the proportions within these limits, novel copolyesters of this invention can be produced which correspond to the general formula (VII)
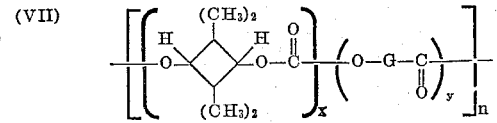

wherein G represents any of the divalent groups set forth for G in Formula VI, and wherein $x$ and $y$ each have values of at least 1 and $n$ has an average value such that the polymer mass has a reduced viscosity value of from about 0.25 to 10.0, preferably 0.4 to 2.7 (0.2 gram polymer in 100 ml. chloroform solution at 25° C.). Preferably $x/(x+y)$ has a value of at least 0.6 and even more preferably, at least 0.8

When all three reactants, i.e., carbonate precursor, hydroxy acid and cyclic diol, are initially charged to a reactor, interaction of any two of the three is possible. Of primary importance are the competing reactions of the carbonate precursor with the cyclic diol, and of the carbonate precursor with the hydroxy acid, which reactions each produce products capable of interreacting with each other or with any of the three initially charged reactants. It is preferred that the number ratio of carbonate groups to residues of hydroxycarboxylic acid be at least 85:15 in the polymer product.

It is, moreover, not necessary that each of the reactants per se be charged to the reactor. In fact, greater control over the composition of the final polymer can be attained by first reacting the carbonate precursor with the cyclic diol, and then reacting the cyclic diol-bis(carbonate ester) thus formed with the hydroxy acid.

The reaction between the carbonate precursor and the cyclic diol results in the formation of one mole of cyclic diol-bis(carbonate ester) for each two moles of carbonate precursor employed. The reaction is illustrated by the following equation in which diphenyl carbonate is representative of the entire class of carbonate precursors.

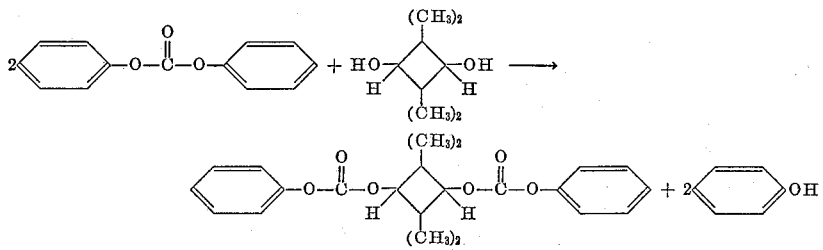

When a dicarboxylic acid is employed instead of a hydroxy monocarboxylic acid, the relative concentration of dicarboxylic acid and cyclic diol bis(carbonate ester) is a critical factor. Theoretically equivalent proportions of dicarboxylic acid and cyclic diol bis-(carbonate ester) react to yield a polyester devoid of carbonate linkages. It is necessary therefore in order to produce copolyesters to limit the proportions of reactants such that the molar concentration of carbonate precursor is at least greater than twice the molar concentration of the 2,2,4,4-tetramethylcyclobutanediol-1,3, and the concentration of this cyclic diol is at least greater than the concentration of the dicarboxylic acid. Stated more concisely, ½C>A>B where A, B and C represent the molar concentrations of cyclic diol, dicarboxylic acid, and carbonate precursor respectively.

It will be apparent that wide variations are possible within these limits. By using such variations, copolyesters of this invention can be produced which conform to the general formula:

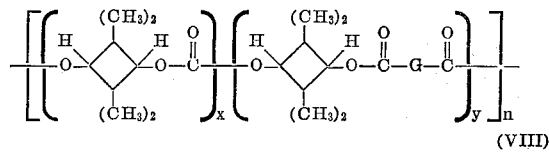

(VIII)

wherein $x$, $y$, G, and $n$ represent the same groups and value limits and preferred ranges as for the copolyesters formed from hydroxy monocarboxylic acid above.

When all three reactants, i.e., a carbonate precursor such as diphenyl carbonate, the cyclic diol, and the dicarboxylic acid, are charged to the reactor, interaction of any two of the three reactants is possible. Of primary importance are the competing reactions of the carbonate precursor with the cyclic diol and with the dicarboxylic acid; the reaction of the dicarboxylic acid with the reaction product of the cyclic diol and the carbonate precursor; the reaction of the cyclic diol with the reaction product of the dicarboxylic acid and the carbonate precursor; and the reaction of cyclic diol bis(carbonate ester) with the reaction product of the dicarboxylic acid and the carbonate precursor.

It is not necessary, however, that each of the reactants per se be charged to the reactor. In fact, greater control over the composition of the final polymer can be attained by first reacting the carbonate precursor with the cyclic diol, and then reacting the cyclic diol bis(carbonate ester) thus formed with the dicarboxylic acid or with the reaction product of the carbonate precursor and the dicarboxylic acid. Preferably the dicarboxylic acid is present in an amount of from about 0.05 to about 0.45 mole per mole of cyclic diol bis(carbonate ester) present. It is preferred that the number ratio of carbonate groups to residues of dicarboxylic acid be at least 85:15 in the polymer product.

Reaction conditions are not significantly different for preparing copolyesters from dicarboxylic acids than for hydroxy monocarboxylic acids. In general, the reaction in both cases is carried out at elevated temperatures sufficient to cause the reactants to be present in the molten state. Although the temperature achieving optimum reaction conditions will vary somewhat for each combination of reactants selected, temperatures in the range of from about 50° C. to about 350° C. have been found to be generally suitable. The temperature of the reaction is not considered to be critical and the optimum range can be ascertained readily by one reasonably skilled in the art. Since the overall reaction involves the evolution of carbon dioxide and either a phenol or an aliphatic alcohol, reduced pressures are advantageously employed, e.g., of the order of 0.2 to 5.0 mm. Hg, particularly in the latter stages of the reaction when sufficient high molecular weight polymer has been formed to inhibit removal of the reaction by-products.

It will be obvious to those skilled in the art that any of the dihydric phenols and aliphatic diols represented by Formulae III and IV above can be substituted for some part, preferably minor, of 2,2,4,4-tetramethylcyclobutanediol-1,3 in the process just described. Similarly, mixtures of two or more dicarboxylic acids, mixtures of two or more hydroxy monocarboxylic acids, and intermixtures of the two types of acids can be employed.

The copolyesters of the present invention comprise at least two of the following four recurring units in their linear chain:

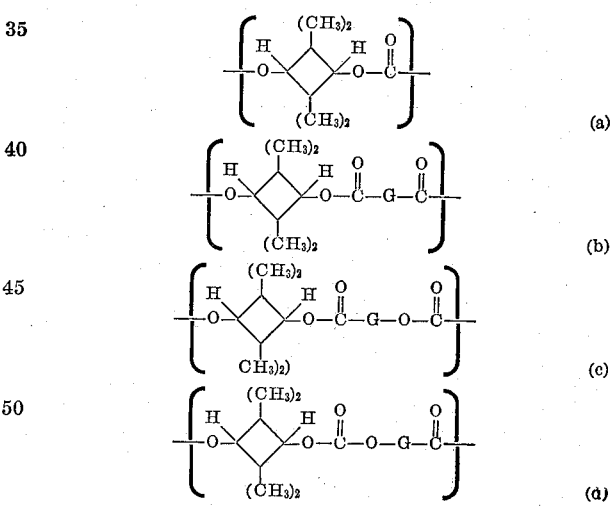

and can contain minor proportions within the limits hereinbefore set forth of the following:

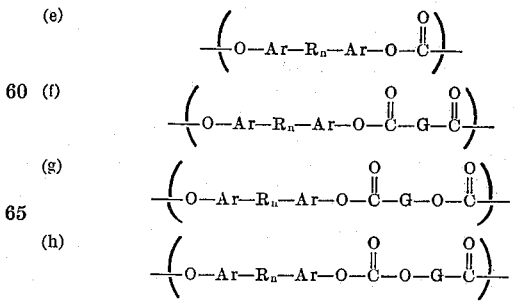

and the corresponding units in which —Ar—$R_n$—Ar— is replaced by the residue of an aliphatic diol, —Y—. In the foregoing structural units, i.e., Formulae $a$ through $h$, Ar, R, $n$, Y and G have the meaning attributed thereto in Formulae III, IV and VI above.

The subject carbonate polymers useful for preparing polymeric foams in accordance with this invention are generally those which exhibit a reduced viscosity of from about 0.2 to about 10 as determined by viscosity measurements of a solution of 0.2 gram of polymer in 100 milliliters of chloroform as solvent at a temperature of 25° C. However, it has been found desirable to employ higher molecular weight carbonate polymers which produce a polymeric foam having a fine texture and a high degree of structural strength. Such higher molecular weight polymers generally exhibit a reduced viscosity, as defined above, of from about 0.4 to about 3.0, and most preferably from about 0.5 to 1.2.

As is well understood in the art, the viscosity of a resin solution bears a direct relationship to the molecular weight and average molecular size of the polymer chains. It is considered to be the most important single property that can be used to characterize the degree of polymerization of a polymer. The reduced viscosity limitations assigned to the polymer masses of the present invention are therefore to be understood as significant in reflecting molecular size rather than merely the viscosity per se. It will further be obvious that reduced viscosity values used herein are of significance only relative to each other rather than in any absolute sense, and for this reason other polycarbonate-solvent systems can be employed without departing from the proper scope of the invention. When solvents other than chloroform are employed the required average molecular size relationship can readily be established by reference to the reduced viscosity values defined herein for chloroform even though the numerical reduced viscosity values of the alternative system may be different.

The (2,2,4,4-tetramethyl-1,3-cyclobutylene) carbonate homopolymer undergoes thermal degradation as shown by the reaction below:

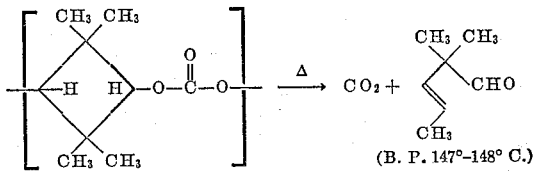

The products of this degradation, carbon dioxide, and 2,2,4-trimethyl-3-pentenal, are both volatile at the degradation temperature and therefore both contribute to the foaming action of the remaining undegraded polymer. Because all of the products of degradation are volatile comparatively large volumes of gas are efficiently and readily produced from a relatively small amount of degraded polymer.

The temperatures at which the subject butane diol carbonate polymers undergo thermal degradation are in excess of 325° C. The rate at which the polymer degrades i.e., the number of polymer molecules which degrade in a given time is dependent to a large extent on the temperature at which they are degraded. For this reason, temperatures in excess of 400° C. have been found to be impractical as the rate of degradation is such that the foaming reaction is difficult to control. Since the density of foamed product is dependent on the volume of gas given off in a given time, control of the reaction rate is essential. Conversely, since to a great extent the reaction rate is dependent upon the reaction temperature the density of the foamed polymeric product can be predetermined by the temperature at which the polymer is degraded for a given reaction period. When the polymer is foamed in a heated mold or injector the density can be predetermined by the temperature and cycle time.

The time at which the carbonate polymer is maintained at the degradation temperature will accordingly vary with the reaction temperature and the density of the foam polymer desired. It has been found however, that a practical residence time at a temperature of 325° C. is from about 1.0 min. to about 20 min. and at a temperature of 500° C. it is from about .5 sec. to about 30 sec.

While foamed carbonate polymer can readily be produced at temperatures in excess of 325° C., it is another embodiment of this invention to provide a method of catalyzing the degradation reaction so that the polymer can be effectively foamed at lower temperatures.

The compounds which have been found to produce this catalytic effect are the weak acid salts of strongly basic metallic hydroxides.

By the term "weak acid salt" is meant those salts exhibiting a pK value of from 8 to 13 inclusive. Illustrative of such weak acids are carbonic acid, boric acid, acetic acid, tartaric acid, arsenic acid, silicia acid, citric acid, benzoic acid, lactic acid, oleic acid, oxalic acid, salicyclic acid and stearic acid.

By the term "strongly basic metallic hydroxides" is meant the hydroxides of the alkali and alkalene earth metals. Illustrative of such strongly basic metallic hydroxides are lithium hydroxide, sodium hydroxide, potassium hydroxide, rubidium hydroxide, cesium hydroxide, beryllium hydroxide, magnesium hydroxide, calcium hydroxide, barium hydroxide and the like.

Illustrative of the salts which serve as catalysts in the reaction of this invention are lithium carbonate, lithium bicarbonate, lithium cyanide, lithium borate, lithium acetate, lithium benzoate, sodium bicarbonate, sodium cyanide, sodium acetate, sodium tartrate, sodium acid tartrate, sodium borate, potassium carbonate, potassium bicarbonate, potassium cyanide, potassium benzoate, potassium acetate, potassium borate, magnesium, carbonate, magnesium borate, calcium carbonate, calcium benzoate, barium carbonate, and the like.

Because of their effectiveness, ease of handling, and low cost, sodium and potassium carbonate have been found to be preferred catalysts.

When the subject polymers of this invention are heated in the presence of a catalyst as defined above, it has been found that thermal degradation effectively occurs at temperatures above 240° C. When these catalysts are used it is desirable to maintain the reaction temperature below 300° C. in order to maintain effective control over the reaction rate. It will be appreciated that when the subject carbonate polymers are foamed catalytically it becomes possible to conduct the foaming step at normal fabrication temperatures for the polymer. This enables one to fabricate foamed articles directly during melt processing such as injection molding, sheeting, extruding, and similar melt processes.

When the catalysts of this invention are utilized, they are employed in catalytic quantities. Since the catalyst concentration, as well as the residence time and temperature of the reaction affect the rate of the decomposition reaction and thus the density, the particular concentration employed will vary dependent upon the product density desired and the reaction conditions. However, it has been found that generally a catalyst concentration of from about 0.01 percent to 35 percent by weight based upon the weight of resin is desirable and a concentration of from 0.5–5% is preferred.

The catalyst can be added to the polymer prior to or during the melt processing of the polymer.

It should be noted that additives normally added to polymer compositions to enhance certain properties can be added to the foam compositions of this invention. Such additives include stabilizers, antioxidants, fillers, pigments, dyes, and the like.

In the illustrations and examples which follow all percentages and parts given are by weight unless otherwise specified.

ILLUSTRATION I

*Preparation of poly(2,2,4,4-tetramethyl-1,3-cyclobutylene)carbonate*

One hundred and eight grams of 2,2,4,4-tetramethylcyclobutanediol-1,3 and 174 grams of diphenyl carbonate were placed in a reaction vessel equipped with a stirrer, a short distillation column and an inlet tube for purified argon. 0.02 gram of LiOH·H₂O was added and the mixture heated at 215° C. for 12 hours. After this time, the distillation of phenol ceased and the temperature was raised to 280–290° C. where it was held at a pressure of from 0.2–0.4 mm. Hg for seven hours. An amorphous, transparent, tough polycarbonate having a reduced viscosity of 1.17 in chloroform (0.2 gram/100 ml. solution at 25° C.) was obtained.

ILLUSTRATION II

*Copolycarbonate of 2,2,4,4-tetramethylcyclobutanediol-1,3 and bis (4-hydroxyphenyl)propane*

Eight grams of 2,2,4,4-tetramethylcyclobutanediol-1,3, 2.00 grams Bisphenol-A and 17.4 grams of diphenyl carbonate and 0.002 grams of LiOH·2H₂O were placed in a side arm test tube, fitted with an inlet tube for purified nitrogen, and heated to 210–230° C. for 3 hours. The temperature was then raised to 280–290° C. and a vacuum of 0.2–5.0 mm. Hg was applied for 3 hours. The resulting, tough amorphous copolymer had a reduced viscosity of 0.89 in chloroform (0.2 gram polymer/100 ml. solution at 25° C.).

ILLUSTRATION III

*Preparation of the copolyester of 2,2,4,4-tetramethylcyclobutanediol-1,3; 2,2-(4,4'-dihydroxy-3,3'-dimethoxy-diphenyl) butane; and isophthalic acid*

The copolyester is prepared by charging to a reactor 144 grams (1.0 mole) of 2,2,4,4-tetramethylcyclobutanediol-1,3; 30.2 grams (0.1 mole) 2,2-(4,4'-dihydroxy-3,3'-dimethoxydiphenyl) butane; 16.6 grams (0.1 mole) isophthalic acid; and 291 grams diphenyl carbonate (∼1.3 moles). The mixture is heated to about 200° C. and continuously agitated. After a period of about 120 minutes the evolution of phenol and carbon dioxide is substantially decreased and the temperature of the reaction system is raised to about 260° with the simultaneous reduction of pressure to about 5.0 mm. Hg. The heating is continued for an additional period of about 2½ hours to obtain a substantially pure high molecular weight copolyester having moieties of the two diols and the dicarboxylic acid in substantially the same proportions as charged.

EXAMPLE I

Pelletized samples of poly(2,2,4,4-tetramethyl-1,3-cyclobutylene)carbonate having a reduced viscosity of 0.79 were injection molded in a two ounce Van Dorn injection molding machine into a tensile test bar. Heat settings and cycle times were adjusted to give material temperatures at the injection nozzle of 325° C., 350° C., and 400° C. respectively. The resulting tough cellular molded bars exhibited densities of 0.90, 0.78 and 0.61 (gm./cc.) respectively and a reduced viscosity of 0.73.

EXAMPLE II

*Preparation of poly(2,2,4,4-tetramethyl-1,3-butylene)carbonate foam by thermal degradation in the presence of various catalysts*

(A) Pelletized samples of poly(2,2,4,4-tetramethyl-1,3-cyclobutylene)carbonate having a reduced viscosity of 0.79 (0.2 gram polymer in 100 milliliters of chloroform at 25° C.), were injection molded at temperatures from 240° C. to 320° C. in a two-ounce Van Dorn injection molding machine. The machine had a cycle time of thirty seconds. Tests on reduced viscosity and foaming indicated no evidence of foam or change in reduced viscosity.

(B) Using the same procedure, apparatus, and tests as set forth in Example IIA above, 0.1 weight percent of potassium carbonate is blended thoroughly with pelletized poly(2,2,4,4-tetramethyl - 1,3 - cyclobutylene)carbonate, said polycarbonate having a reduced viscosity of 0.68. The sample is then injection molded at 270° C. The resulting molded articles are cellular and tough; having a density of .86 gram per cubic centimeter at 30° C. and a reduced viscosity of .66.

(C) Using the same procedure, apparatus, and tests as set forth in Example IIA above, 0.2 weight percent of sodium cyanide is blended thoroughly with pelletized poly(2,2,4,4-tetramethyl - 1,3 - cyclobutylene)carbonate, said polycarbonate having a reduced viscosity of 0.68. Samples were then injection molded at 270° C. The resulting molded articles are cellular and tough. Density is about 0.43 gram per cubic centimeter and reduced viscosity is about 0.66.

(D) Using the same procedure, apparatus, and tests as set forth in Example IIA above, 0.15 weight percent of potassium citrate is blended thoroughly with pelletized poly(2,2,4,4-tetramethyl - 1,3 - cyclobutylene)carbonate, said polycarbonate having a reduced viscosity of about 0.68; the polycarbonate homopolymer is then injection molded at 275° C. The resulting molded articles are cellular and tough and exhibit a density of about 0.62 gram per cubic centimeter and a reduced viscosity of about 0.66.

(E) In the same manner as set forth in Example IIC above, 0.1 weight percent respectively of samples of sodium carbonate, sodium bicarbonate, potassium acetate, potassium metaborate, potassium cyanide, sodium acetate, calcium carbonate, and sodium benzoate are blended thoroughly with pelletized poly(2,2,4,4-tetramethyl-1,3-cyclobutanediol)carbonate, having a reduced viscosity of 0.68, and injection molded at 270° C. The resulting molded articles are cellular, tough, and possess a density in the range of about 0.5 to 0.85 gram per cubic centimeter (30° C. and a reduced viscosity of 0.66).

EXAMPLE III

*Preparation of foamed carbonate copolymers of: (A) 2,2,4,4-tetramethyl-1,3-cyclobutanediol (90%) and bisphenol A (10%); and (B) 2,2,4,4-tetramethyl-1,3-cyclobutanediol (80%) and cyclohexane dimethanol-1,4 (20%)*

Pelletized copolymers A and B having a reduced viscosity of 0.91 and 0.82 respectively were injection molded at temperatures of 375° C. and 425° C. in a two-ounce Van Dorn machine. Cycle times were of the order of 60 seconds.

The resulting foamed articles had the following reduced viscosities and densities:

|  | Copolymer A | Copolymer B |
| --- | --- | --- |
| 375° C. R.V. | 0.90 | 0.77 |
| 375° C. density | 0.81 | 0.83 |
| 425° C. R.V. | 0.78 | 0.76 |
| 425° C. density | 0.51 | 0.58 |

Using the same procedure and apparatus 0.3% sodium carbonate was added to copolymer A and 0.6% sodium cyanide was added to copolymer B. Both materials were then injection molded at 285° C. the results are as follows:

|  | Copolymer A+0.3% Na₂CO₃ | Copolymer B+0.5% NaCN |
| --- | --- | --- |
| Reduced viscosity | 0.79 | 0.77 |
| Density | 0.61 | 0.54 |

EXAMPLE IV

*Preparation of foamed carbonate copolyesters of: (A). 2,2,4,4-tetramethyl-1,3-cyclobutanediol, 90% carbonic acid and 10% terephthalic acid; and (B). 2,2,4,4-tetramethyl-1,3-cyclobutanediol, 85% carbonic acid and 15% trans-1,2-cyclobutane dicarboxylic acid*

Pelletized copolyesters A and B having a reduced viscosity of 0.67 and 1.12 respectively were injection molded at 285° C. into transparent-non-foamed test bars with the following properties:

|  | A | B |
|---|---|---|
| R.V. | 0.67 | 1.12 |
| Density | 1.05 | 1.08 |

Using the same procedure as above 0.6% of sodium benzoate and 0.4% of potassium citrate were blended with A and B respectively and injection molded at 285° C. in the same machine under identical conditions the results were as follows:

|  | A | B |
|---|---|---|
| R.V. | 0.65 | 1.07 |
| Density | 0.64 | 0.71 |

The polymeric foams of the present invention exhibit densities of from 0.4000 gram per cubic centimeter to 1.0670 grams per cubic centimeter. As has been indicated these foams are highly weather resistant and exhibit high tensile strength and rigidity. These foams also exhibit excellent thermal insulation properties making them ideal for building structures, panel construction, pipe insulation, and the like. The foams exhibiting densities less than that of water (1.0 gram per cubic centimeter) find application in boat construction, life jackets, surf boards, buoys, water toys, and the like. The low density of these foams combined with their outstanding weather resistance and strength makes them ideal for such uses.

What is claimed is:

1. A process for preparing a (2,2,4,4-tetramethyl-1,3-cyclobutylene) carbonate polymer foam comprising the steps of heating a normally solid (2,2,4,4-tetramethyl-1,3-cyclobutylene)carbonate polymer wherein the cyclobutylene carbonate moiety is present in a mole percent of at least about 50 percent, to a temperature above its melting point, maintaining said molten mass at a temperature and for a period of time sufficient to cause the evolution of gaseous polymer degradation products of the (2,2,4,4-tetramethyl - 1,3 - cyclobutylene)carbonate polymer, maintaining a pressure about said molten polymer mass such that the gaseous products are retained within the molten polymer mass, and cooling the polymer mass to a temperature sufficient to cause solidification.

2. A (2,2,4,4-tetramethyl-1,3-cyclobutylene)carbonate polymer foam produced by the process of claim 1.

3. A process for preparing a (2,2,4,4-tetramethyl-1,3-cyclobutylene)carbonate polymer foam comprising the steps of melting a (2,2,4,4-tetramethyl-1,3-cyclobutylene)carbonate polymer having a reduced viscosity of from 0.2 to 10 and wherein the cyclobutylene carbonate moiety is present in a mole percent of at least about 50 percent, as measured for 0.2 gram of polymer in 100 milliliters of chloroform at a temperature of 25° C., heating the molten polymer to a temperature of from 325° C. to 400° C. and maintaining this temperature for a period of time to cause the evolution of gaseous polymer degradation products of the (2,2,4,4-tetramethyl-1,3-cyclobutylene) carbonate polymer, maintaining a pressure about said molten polymer mass to such that the gaseous degradation products are retained within the molten polymer mass and cooling the polymer mass to a temperature sufficient to effect solidification of the foamed polymer mass.

4. The process of claim 3 wherein the (2,2,4,4-tetramethyl-1,3-cyclobutylene)carbonate polymer exhibits a reduced viscosity of from 0.4 to about 3.0 as measured for 0.2 gram of polymer in 100 milliliters of chloroform at a temperature of 25° C.

5. The process of claim 4 wherein said (2,2,4,4-tetramethyl-1,3-cyclobutylene)carbonate polymer is 2,2,4,4-tetramethyl-1,3-cyclobutylene)carbonate homopolymer.

6. A process for preparing a (2,2,4,4-tetramethyl-1,3-cyclobutylene)carbonate polymer foam comprising the steps of heating a (2,2,4,4-tetramethyl-1,3-cyclobutylene)carbonate polymer having a reduced viscosity of from 0.2 to 10 as measured for 0.2 gram of polymer in 100 milliliters of chloroform at a temperature of 25° C. and wherein cyclobutylene carbonate moiety is present in a mole percent of at least about 50 percent, to a temperature of from 240° C. to 300° C. in the presence of a catalyst of a weak acid salt of a strongly basic metallic hydroxide said salt having a pK value of from 8 to 13, maintaining the polymer mass at this temperature for a sufficient period of time to cause the evolution of gaseous polymer degradation products of the (2,2,4,4-tetramethyl-1,3-cyclobutylene)carbonate polymer, maintaining a pressure about said polymer mass such that the gaseous degradation products are retained within the molten polymer mass and thereafter cooling said polymer mass to a temperature sufficient to cause solidification.

7. The process of claim 6 wherein the catalyst is an alkali metal salt of carbonic acid.

8. The process of claim 6 wherein the carbonate polymer is (2,2,4,4-tetramethyl-1,3-cyclobutylene)carbonate homopolymer.

9. The process of claim 6 wherein the catalyst is a member selected from the group consisting of lithium carbonate, lithium bicarbonate, lithium cyanide, lithium borate, lithium acetate, lithium benzoate, sodium bicarbonate, sodium cyanide, sodium acetate, sodium tartrate, sodium acid tartrate, sodium borate, potassium carbonate, potassium bicarbonate, potassium cyanide, potassium benzoate, potassium acetate, potassium borate, magnesium carbonate, magnesium borate, calcium carbonate, calcium benzoate, and barium carbonate.

References Cited

UNITED STATES PATENTS

| 3,224,983 | 12/1965 | D'Alelio | 260—2.5 |
| 3,277,029 | 10/1966 | Chadurick et al. | 260—2.5 |
| 3,313,777 | 4/1967 | Elam et al. | 260—47 |

MURRAY TILLMAN, *Primary Examiner.*

J. T. GOOLKASIAN, *Assistant Examiner.*